United States Patent
Fuxa et al.

(10) Patent No.: US 10,007,441 B2
(45) Date of Patent: Jun. 26, 2018

(54) STORAGE SYSTEM BANDWIDTH ADJUSTMENT

(71) Applicant: HEWLETT-PACKARD DEVELOPMENT COMPANY, L.P., Houston, TX (US)

(72) Inventors: James Alexander Fuxa, Houston, TX (US); Michelle Elizabeth Geppert, Houston, TX (US); Keith Orsak, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 26 days.

(21) Appl. No.: 15/305,546

(22) PCT Filed: Apr. 30, 2014

(86) PCT No.: PCT/US2014/036036
§ 371 (c)(1),
(2) Date: Oct. 20, 2016

(87) PCT Pub. No.: WO2015/167490
PCT Pub. Date: Nov. 5, 2015

(65) Prior Publication Data
US 2017/0046075 A1    Feb. 16, 2017

(51) Int. Cl.
*G06F 13/20*    (2006.01)
*G06F 13/00*    (2006.01)
*G06F 3/06*    (2006.01)
*G06F 13/40*    (2006.01)
*G06F 13/38*    (2006.01)

(52) U.S. Cl.
CPC .......... *G06F 3/0611* (2013.01); *G06F 3/0625* (2013.01); *G06F 3/0665* (2013.01); *G06F 3/0689* (2013.01); *G06F 13/385* (2013.01); *G06F 13/4022* (2013.01); *G06F 13/4027* (2013.01); *Y02D 10/14* (2018.01); *Y02D 10/151* (2018.01)

(58) Field of Classification Search
None
See application file for complete search history.

(56) References Cited

U.S. PATENT DOCUMENTS 7,447,824 B2   11/2008   Jabori et al.
7,536,490 B2   5/2009   Mao
8,347,010 B1 *  1/2013   Radovanovic .......... G06F 13/38
                                                710/2

(Continued)

FOREIGN PATENT DOCUMENTS

WO    WO-2016036374 A1    3/2016

OTHER PUBLICATIONS

Bellosa, F., "Process Cruise Control: Throttling Memory Access in a Soft Real-time Environment," (Research Paper), Jul. 1997, 16 pages, available at http://os.itec.kit.edu/english/21_991.php.

(Continued)

*Primary Examiner* — Hyun Nam
(74) *Attorney, Agent, or Firm* — International IP Law Group, PLLC (57) ABSTRACT

Techniques to determine an adjustment to front end bandwidth of a server based on backend bandwidth and to adjust power consumption of an input/output (I/O) device.

18 Claims, 5 Drawing Sheets

(56) References Cited

U.S. PATENT DOCUMENTS

| | | | |
|---|---|---|---|
| 8,429,436 B2 | 4/2013 | Fillingim et al. | |
| 8,582,448 B2 | 11/2013 | Khatri et al. | |
| 8,656,088 B2 | 2/2014 | Belluomini et al. | |
| 2002/0152355 A1* | 10/2002 | Otterness | G06F 3/0617 |
| | | | 711/114 |
| 2004/0064752 A1 | 4/2004 | Kazachinsky et al. | |
| 2004/0122938 A1 | 6/2004 | Messick et al. | |
| 2005/0099766 A1* | 5/2005 | Fraley | G11B 27/36 |
| | | | 361/679.33 |
| 2008/0228959 A1 | 9/2008 | Wang | |
| 2008/0263246 A1 | 10/2008 | Larson et al. | |
| 2010/0125695 A1* | 5/2010 | Wu | G06F 3/0613 |
| | | | 711/103 |
| 2010/0274953 A1 | 10/2010 | Lee et al. | |
| 2012/0066439 A1 | 3/2012 | Fillingim | |
| 2012/0314763 A1 | 12/2012 | Kuhtz | |
| 2012/0331207 A1 | 12/2012 | Lassa et al. | |
| 2013/0007489 A1 | 1/2013 | Unnikrishnan et al. | |
| 2013/0318278 A1 | 11/2013 | Wu | |
| 2014/0006675 A1 | 1/2014 | Meir | |
| 2014/0013070 A1 | 1/2014 | Toronyi et al. | |
| 2014/0056316 A1 | 2/2014 | Ling et al. | |
| 2017/0160784 A1* | 6/2017 | Fuxa | G06F 1/324 |

OTHER PUBLICATIONS

Intel Corporation, "Intel Gigabit CT Desktop Adapter Benefits and Support Overview," (Research Paper), Aug. 10, 2008, 2 pages, available at http://www.intel.com/content/www/us/en/network-adapters/gigabit-network-adapters/gigabit-ct-desktop-adapter.html.

International Search Report & Written Opinion received in PCT Application No. PCT/US2014/036036, dated Jan. 28, 2015, 10 pages.

Kennedy, P., "LSI SAS 2308 RAID Controller—HBA Information and Listing," (Web Page), May 30, 2012, 7 pages, available at http://www.servethehome.com/lsi-sas-2308-raid-controller-hba-information-listing/.

International Search Report & Written Opinion received in PCT Application No. PCT/US2014/054110, dated Apr. 28, 2015, 13 pages.

* cited by examiner

STORAGE SYSTEM BANDWIDTH ADJUSTMENT

BACKGROUND

Power consumption in computer systems has gained increased visibility in recent years due to the mobile market demanding lower power solutions for battery-based products. This visibility has spilled over into the enterprise arena, with demands for lower power and thus lower cost of ownership driving purchasing decisions. In general, it may be beneficial to reduce power consumption in the managing and storing of data, and in the provision of access to networks, servers, files, data, and so forth.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Examples of techniques may determine an adjustment to front end bandwidth of a server based on backend bandwidth and to adjust power consumption of an input/output (I/O) device. In particular examples, the server may be a host in a storage system, and the adjusted power consumption of an I/O device that is a storage controller. In a specific example, a peripheral component interconnect express (PCIe) technology may be employed. Also, in a specific example, the storage system may be a redundant array of independent disks (RAID) storage system. In examples, the storage controller may be a RAID controller or a host bus adapter (HBA). Of course, other storage controller types may be implemented with the techniques.

Figure 1:
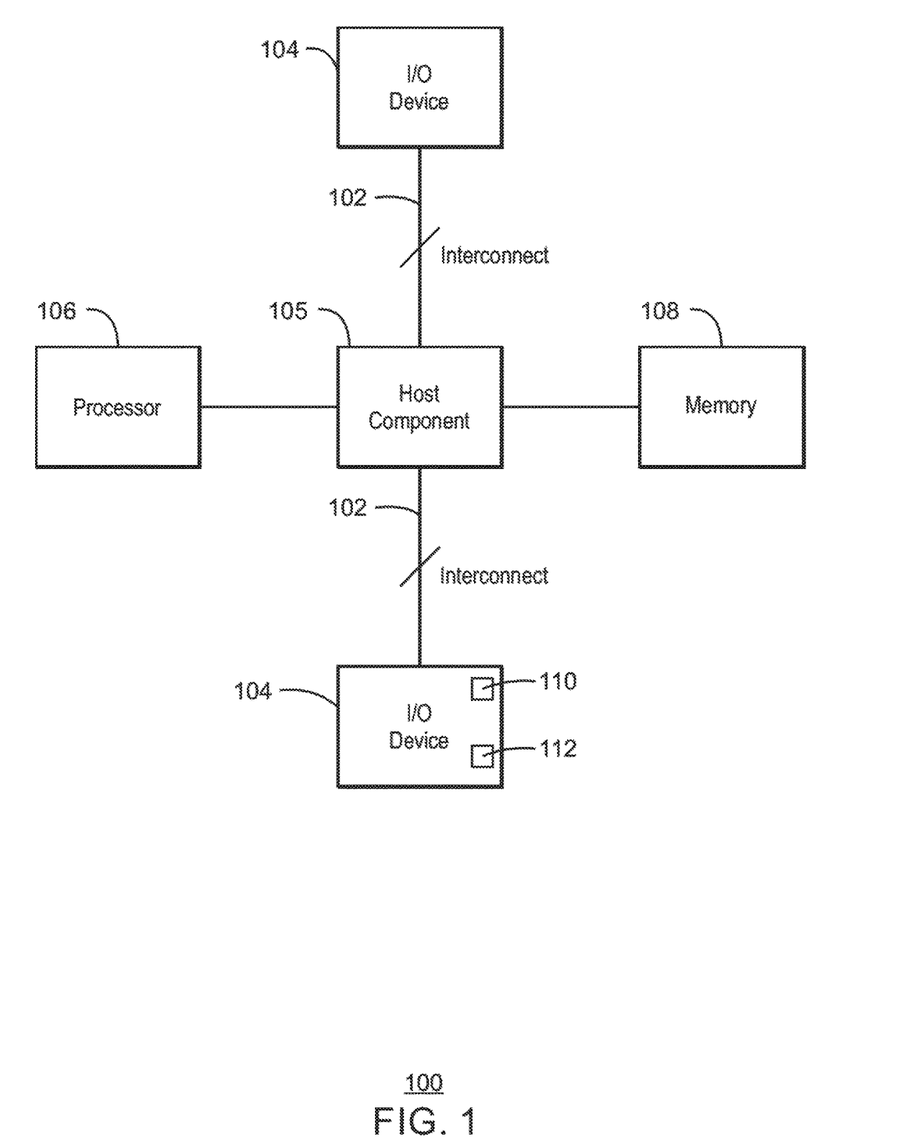
FIG. 1 is a block diagram of an exemplary server in accordance with examples.

FIG. 1 depicts components of an exemplary server 100 that throttles speed of its interconnects 102 to lower power consumption. The server 100 includes a bus having at least one interconnect 102. The bus may be a communication bus, peripheral bus, PCIe bus, or other bus type. The interconnect 102 may involve serial and/or parallel aspects to accommodate links and connections for communication, peripherals, data, and so on. The interconnect 102 may include PCIe, QuickPath Interconnect (QPI), RapidIO architecture, HyperTransport (HT), Small Computer System Interface (SCSI), Serial Attached SCSI (SAS), Ethernet, InfiniBand, Fibre Channel (FC), Serial Advanced Technology Attachment (SATA), and the like. At least a portion of an interconnect 102 may reside on a base structure of the server 100. The base structure may be, for example, a mainboard, system board, motherboard, logic board, and so forth. The interconnects 102 may include switches, lanes, wirings; pairs of wires, and so forth. In the illustrated embodiment, the interconnects 102 communicatively couple input/output (I/O) devices 104 to a host component 105 of the server 100. The host component 105 may be, for instance, a bridge, root complex for PCIe, chipset, etc.

The server 100 may include a processor 106 and a memory 108 coupled to the host component 105. The processor 106 may be a central processing unit (CPU) or other type of processor. The memory 108 may include nonvolatile memory, volatile memory, system memory, read-only memory (ROM), random access memory (RAM), and so forth.

The I/O devices 104 may be a storage controller, I/O controller, input controller, output controller, network controller or card, graphics controller or card, host bus adapter (HBA), enterprise controller, simple controller, disk controller, disk array controller, and the like. One or more of the I/O devices 104 may include a processor 110 and a memory 112. The I/O devices 104 may be onboard or integrated into a base structure e.g., motherboard) of the server 100, or may be coupled to a slot or other interface on the base structure, for example.

The I/O devices 104 and interconnects 102 generally route data and signals between the host component 105 and backend devices (not shown) coupled behind the I/O devices 104. The host component 105 (and associated processor 106 and memory 108) may be the source or recipient of the data and signals. Likewise, the devices behind the I/O device 104 may be the source or recipient of the data and signals. Indeed, the host component 105 and the backend devices may be in a back-and-forth communication via the I/O devices 104 and interconnects 102.

The backend devices may be part of the server 100 or external to the server. The backend devices may be storage device(s), mass storage, disk drive(s), flash drive, mouse, keyboard, display monitor, etc. The backend devices may be associated with a network, another system or server, client or user devices, and so on.

To manage or lower power consumption, the server 100 may reduce the speed of the bus or interconnect 102 and the I/O device 104 to below capability when such (full) capability is not needed to satisfy the bandwidth requirement of the backend devices. For example, if an interconnect 102 and I/O device 104 are each capable to 1000 megabyte per second (MB/s) but the sum of the backend devices associated with that I/O device 104 require only a maximum 500 MB/s, the server 100 may alter the settings of the interconnect 102 and/or I/O device 104 to operate at less than capability to as low as 500 MB/s. Such an adjustment may lower power consumption of the server 100 including of the I/O device 104 and/or interconnect 102. The relevant settings may be stored in memory 108 or memory 112, for example.

In a particular example of PCIe Generation 3.0 capability 985 MB/s) with a PCIe Gen. 3.0 bus having a PCIe Gen. 3.0 serial interconnect 102, and a PCIe Gen. 3.0 I/O device 104, the server 100 could alter the PCIe settings of the I/O device 104 to negotiate a Generation 2.0 speed of 500 MB/s, for instance, to satisfy a summed backend requirement of an I/O device 104 of 500 MB/s. Thus, power consumption would be lowered due to the reduced speed (Generation 2.0 instead of Generation 3.0) employed.

In addition, the server 100 could reduce the interconnect 102 number of lanes to lower power consumption. In particular, in the case of a PCIe application or other application employing lanes, the server 100 could alter PCIe settings to negotiate the number of lanes of the interconnect 102. In other words, the server 100 may alter PCIe settings to reduce the number of active lanes from the interconnect 102 to the I/O device 104 to provide bandwidth below capability but that satisfies demand. In certain examples, PCIe settings may be altered or set in the Basic Input/Output System (BIOS).

In operation, the server 100 may determine the total backend bandwidth requirement of the devices behind an I/O device 104. Further, the server 100 may determine the options (including choosing an option) for adjusting the speed (generation) and/or number of lanes. The executable code to make such determinations may be stored in the memory 108 or memory 112, for example, and executed by the processor 106 or processor 110, for instance. Of course, other configurations for storing and implementing (executing) such code are applicable.

Moreover, the server 100 may be configured via stored executable code to implement the adjustments such as in altering settings. Implementing an adjustment may be performed automatically or with the server 100 and backend devices online. On the other hand, the adjustments can be implemented offline or in a reboot, for instance.

Figure 2:
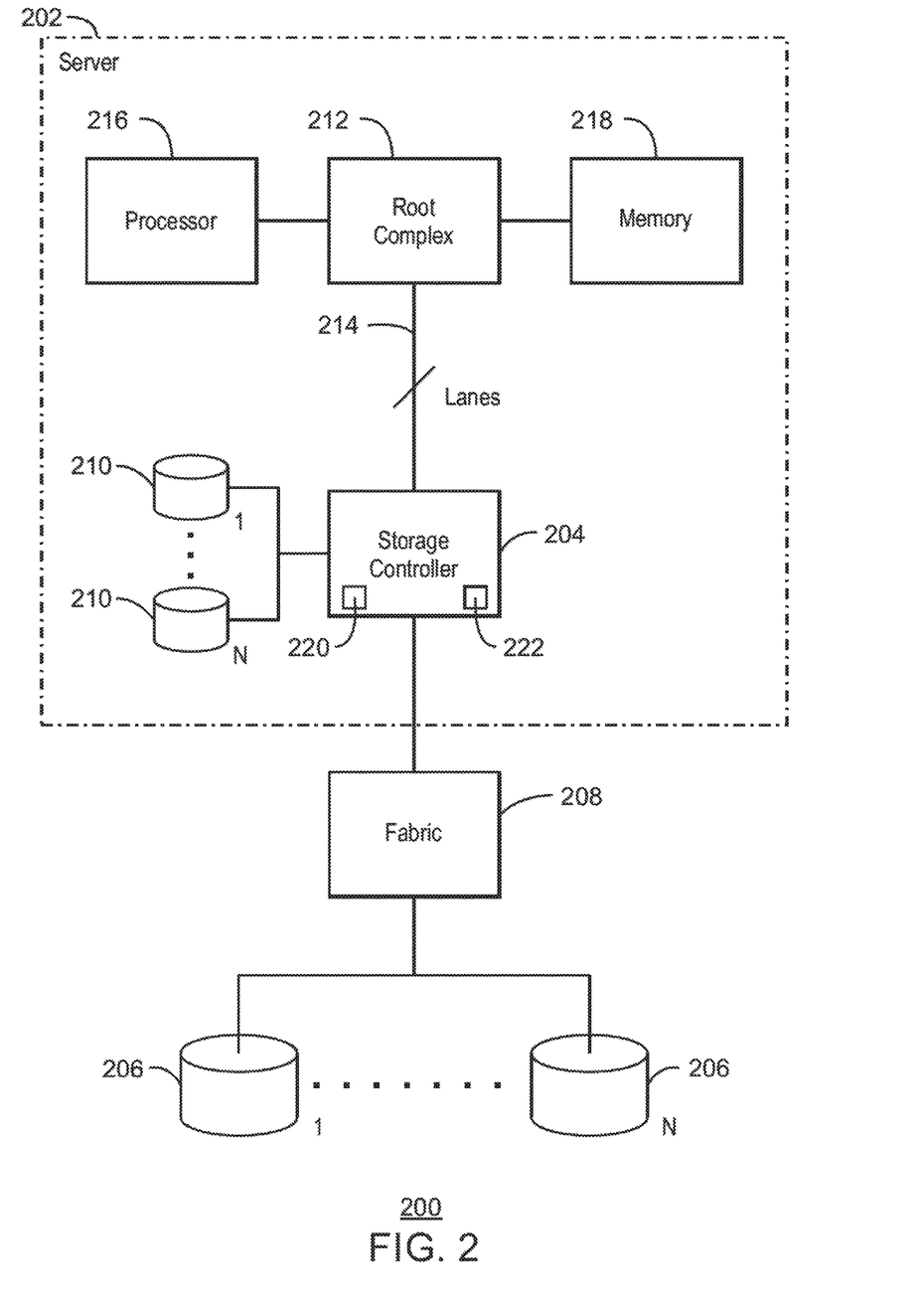
FIG. 2 is a block diagram of an exemplary storage system in accordance with examples.

FIG. 2 is a storage system 200 including a host or server 202 with a storage controller 204 communicatively coupled to an array of storage drives 206 through a storage fabric 208. In certain examples, such as with storage systems 200 accommodating a RAID configuration and capability, or other configurations, the server 202 may be more commonly labeled as a host.

One or more direct or attached storage drives 210 may be coupled to the storage controller 204. The attached storage drives 210 may be internal or external to the server 202. The storage drives 206 and 210 may be disk drives, hard disk drives (HDD), solid state drives (SSD), flash drives, and so on. The storage drives 206 and 210 may store data including "user data" which may refer to data that a person or entity might use in the course of business performing a job function or for personal use. Such user data may be business data and reports, Web pages, user files, image files, video files, audio files, software applications, or any other similar type of data that a user may wish to save to or retrieve from storage.

The storage drives 206 and 210 and the storage fabric 208 may be characterized as a backend of the storage system. A variety of protocols may be employed in the storage fabric 208. Moreover, a storage controller 104 may use the same or different protocols for back-end and for front-end communication. In certain examples, PCIe is used on the front-end and SAS, SATA, or PCIe used on the backend. Other enterprise storage controllers may use fibre channel (FC) on the front-end and SATA on back-end, for example. Of course, many other configurations and topologies are applicable. The storage system 200 may be associated with data storage services, a data center, cloud storage, a distributed system, storage area network (SAN), virtualization, and so on. Again, however, the storage system 200 may be for data storage with the storage controller as a RAID controller or host bus adapter (HBA), for example, and the front-end as PCIe or similar protocol for instance, and the back-end as SAS, SATA, or PCIe, and so on.

In the illustrated example for the front end, the storage controller 204 is coupled to a host component (e.g., root complex 212) of the server 202 via a bus or serial interconnect having lanes 214. In certain examples, PCIe technology is employed. Other technologies such as Ethernet or InfiniBand, and so on, may be employed in lieu of or in addition to PCIe bus. A processor 216 (e.g., a CPU) and a memory 218 may be operationally coupled to the root complex 212. The storage controller 204 may have a processor 220 and memory 222. The memory 218 and memory 222 may include nonvolatile and/or volatile memory.

Certain examples of the present techniques may involve PCIe throttling (e.g., a configuration-based PCIe throttling) of the storage controller 204 based on attached devices such as the fabric 208, drives 206, and drives 210. The techniques may manage and reduce total power used by the storage controller 204 by adjusting or reducing the utilized number of PCIe lanes 214, and/or by adjusting or lowering negotiated PCIe generation (speed) through the lanes 214 and the storage controller 204. Such adjustments or reduction of generation or speed and number of lanes may be implemented without compromising performance requirements of the storage controller 104.

Storage controllers (e.g., storage controller 204) for disk subsystems may be designed and built to handle a variety of loads, from a single HDD to 100's of SSD's in a RAID-6 configuration performing caching, for example. While different hardware skews may help to reduce/expand resources when beneficial, there are configurations for which the storage controller may be significantly more capable than the underlying storage configuration. Accordingly, examples of the present techniques provide for detecting the amount of PCIe capability required in configurations that do not need or demand the full capabilities (e.g., full PCIe capabilities) of the controller 204—so that power can be scaled back.

As indicate in examples of FIG. 2, storage controllers may be connected to the server (host) system through a PCIe bus. The storage controllers negotiate the number of PCIe lanes and PCIe generation to support the type of host system they are coupled or plugged into. Storage controllers may also advertise the PCIe capabilities they have per the PCIe specification, for instance. The more lanes and newer the generation negotiated, the more I/O can be performed to the storage controller. However, at faster speeds, the power draw is greater.

To determine a beneficial or optimal PCIe generation and number of PCIe lanes to negotiate, the storage controller (e.g., storage controller 204) may understand how fast its associated disk subsystem (e.g., drives 206, storage fabric 208, and attached drives 210) can perform I/O's. A technique to determine, observe, or calculate such backend bandwidth may involve running a bandwidth test upon insertion of a new drive (e.g., a new drive 206 or 210). This test may perform sequential reads on the inserted drive and measure or calculate the bandwidth of the drive during this test, for example. Typically, there is a ramp-up time for drive accesses. Thus, the determined bandwidth may be based on a steady state condition occurring after an initial inconsistent ramp period, as depicted in the graph of FIG. 3.

Figure 3:
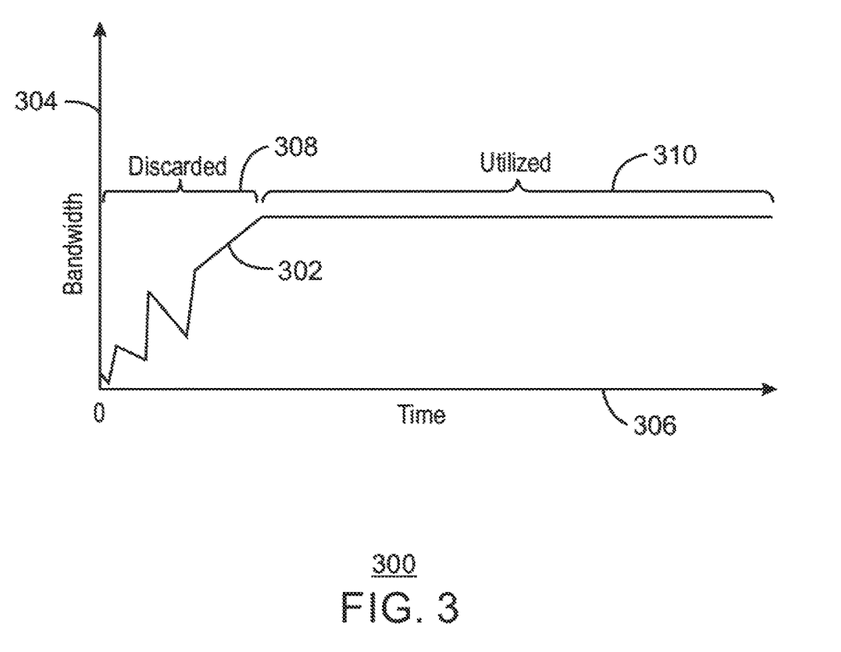
FIG. 3 is a graph of an exemplary bandwidth curve of a bandwidth test in accordance with examples.

FIG. 3 is a graph 300 of a curve 302 of bandwidth 304 over time 306. The graph 300 represents a conceptual bandwidth test of a newly inserted drive 206. The bandwidth data collected or calculated during the initial erratic ramp period 308 may be discarded. The bandwidth data collected or calculated during a steady state condition 310 may be utilized as the measured bandwidth data for the basis of the bandwidth requirement determination of the newly inserted drive 206 or 210. This tested bandwidth for the newly inserted drive may be summed with bandwidth requirement data stored for the other active drives to give a total bandwidth requirement of the drives.

At the conclusion of the bandwidth test, the bandwidth information and results may be stored and associated with the tested drive so that future mounting or insertions of the drive may not need a re-run of the test. The bandwidth values may be stored in and retrieved from various memory such as memory 218, memory 222, in a storage drive(s) 206 or 210, or other memory.

In general, to determine a beneficial or optimum configuration to reduce power consumption, the total backend bandwidth may first be determined. For example, as part of the total backend bandwidth, the total bandwidth of any attached drives 210 may be determined. An exemplary equation for total bandwidth (BW) of attached drives 210 may be expressed as:

$$\text{Bandwidth } (BW) \text{ of Direct Attached Drives} \quad \text{Equation 1}$$

$$BW \text{ of Direct Attached Drives} = \sum_{N=1}^{N=\text{Direct Attached Drives}} BW_N.$$

Additionally, a total backend bandwidth calculation may further incorporate the bandwidth of the drives 206 associated with the storage fabric 208. Thus, in certain examples, the total or maximum bandwidth of all backend devices may include the above determination for the attached drives 210 plus a calculation of the minimum of (1) the bandwidth for the minimum link rate to the storage fabric 208 and (2) the bandwidth of the performance ca ability of all individual drives 206. In such an approach, an exemplary equation of the total backend bandwidth may be expressed as follows:

$$BW \text{ of all Drives} \quad \text{Equation 2}$$

$$BW = \left( \sum_{N=1}^{N=\text{Direct Attached Drives}} BW_N \right) + \left( \sum_{N=1}^{N=\text{Links to Devices}} \min\left( \text{Link } BW_N, \sum_{M=1}^{M=\text{Drives behind Device}} BW_M \right) \right).$$

The calculated maximum bandwidth value of the backend of the storage sub system may be employed to adjust the maximum throughput of that permitted on the front end.

For the sake of simplicity in an example calculation, a case is considered with the attached drives 210 as the total backend of the storage system 200 (e.g., the storage system 200 does not include drives 206 and fabric 208). Further assumed in this calculation example is the storage controller 204 having 8 Gen-3 PCIe lanes on the front end (to interconnect lanes 214) and 2 direct attached drives 210 in a RAID-1 configuration on the backend capable of 275 MB/sec each. Thus, it may be desired that the front end be capable of 550 MB/sec:

$$BW = \sum_{N=1}^{N=2} \{275, 275\} = 550 \text{ MB/sec}$$

This may result in the need for only 1 PCIe lane instead of all 8, as indicated below (resulting in power savings).

$$PCIe \text{ Lanes} = \frac{BW}{BW \text{ of 1 } PCIe \text{ Gen3 Lane}} = \frac{550 \text{ MB/sec}}{985 \text{ MB/sec}} = 1 \text{ PCIe Lane}$$

Many storage controllers can negotiate both number of PCIe lanes and Generation/speed of the PCIe bus. The generation and lane combination to utilize can also be calculated with the total potential backend bandwidth, as indicated below, continuing with the above example basis.

$$\text{Option 1: } PCIe \text{ Lanes at Gen 3} = \frac{550 \text{ MB/sec}}{985 \text{ MB/sec}} = 1 \text{ PCIe Gen 3 Lane}$$

$$\text{Option 2: } PCIe \text{ Lanes at Gen 2} = \frac{550 \text{ MB/sec}}{500 \text{ MB/sec}} = 2 \text{ PCIe Gen 2 Lane}$$

The selection between the two options above may be based on which option gives the lowest power draw. The advertised PCIe settings may be adjusted to implement the selected option.

In certain cases, a bandwidth correction factor (or reduction actor) may be employed. To explain, the scope of bandwidth calculation in the calculation example above (whether based on a system 200 with only direct attached drives 210 as calculated, or based on a system 200 further including drives 206 and storage fabric 208) may be referred herein as a base calculation or the "direct bandwidth calculation" and may be conservative. Such a conservative calculation typically assumes there is a 1:1 ratio between backend and front end I/O's.

However, a storage controller 204 as a RAID controller often creates significant extra I/O in order to create redundancies. In benchmark scenarios and for users whose performance needs outweigh the desire to reduce power, the direct bandwidth calculation may be appropriate. Yet, for users who prefer a more aggressive approach to power savings, presented herein is a variation of the "redundant I/O mix bandwidth calculation."

In a non-degraded state, the reads to RAID controllers generally may require the same amount of data transfer as non-redundant storage controllers. However, the writes may be amplified based on the RAID level. The following Table 1 provides a high-level exemplary overview of the number of transactions to the disk drives for each incoming write. It should be noted that the principle may apply to most or all RAID levels. Table 1 provides some examples. The power savings formulas may work with other RAID levels as well.

TABLE 1

Transactions to Drives for Incoming Writes

| RAID level | Small random writes | Large or sequential writes |
| --- | --- | --- |
| RAID-0 | 1 | 1 |
| RAID-1 | 2 | 2 |
| RAID-3 | 1 + (1/n) | 1 + (1/n) |
| RAID-4 | 4 | 1 + (1/n) |
| RAID-5 | 4 | 1 + (1/n) |
| RAID-6 | 6 | 1 + (2/n) | n = the number of drives in the RAID level configuration

By employing RAID controller analytics to measure the user workload, the following variables may be determined: read/write ratio, I/O block sizes, and I/O sequentiality. Based on these variables and the write amplification as indicated in TABLE 1 above and associated with RAID operation, a bandwidth reduction factor (BWRF) may be determined to reduce the initially-calculated bandwidth (base bandwidth calculated with the "direct bandwidth calculation")—to give the effective bandwidth.

Bandwidth Reduction Factor (BWRF)   Equation 3

$$\text{Bandwidth Reduction Factor } (BWRF) = (\text{Read IO Ratio}) + \left(\frac{\text{Write IO Ratio}}{\text{Write IO Amplification}}\right).$$

Effective BW   Equation 4

$$\text{Effective } BW = BWRF * \left(\sum_{N=1}^{N=\text{Direct Attached Drives}} BW_N\right) +$$

$$BWRF * \left(\sum_{N=1}^{N=\text{Links to Devices}} \min\left(\text{Link } BW_N, \sum_{M=1}^{M=\text{Drives behind Device}} BW_M\right)\right).$$

Extending the foregoing example with RAID-1 to incorporate the reduction factor correlative with additional example parameters such as read/write ratio of 2:1, block size same as the strip size, I/O as random, and the like, may be introduced In this example with RAID-1, the bandwidth reduction factor may be calculated as:

$$\text{Bandwidth Reduction Factor} = \left(\frac{2}{3}\right) + \left(\frac{\frac{1}{3}}{2}\right) = \frac{5}{6}$$

Therefore, in this example, the base bandwidth calculation can be updated to give a corrected or effective bandwidth by applying the bandwidth reduction factor:

$$\text{Effective } BW = \left(\frac{5}{6}\right) * 550 \text{ } MB/\text{sec} = 459 \text{ } MB/\text{sec}$$

Such a correction or reduction can in some cases facilitate a reduction in the speed and/or number of PCIe lanes required and therefore provide for a configuration with lower power required. In this example, the result of applying the reduction factor may be to run the single lane at Generation 2 instead of Generation 3, giving further power reduction.

$$PCIe \text{ Lanes at Gen } 3 = \frac{459 \text{ } MB/\text{sec}}{985 \text{ } MB/\text{sec}} = 1 \text{ } PCIe \text{ Gen } 3 \text{ Lane}$$

$$PCIe \text{ Lanes at Gen } 2 = \frac{459 \text{ } MB/\text{sec}}{500 \text{ } MB/\text{sec}} = 1 \text{ } PCIe \text{ Gen } 2 \text{ Lane}$$

In certain instances, a reduction in the number of lanes may save more power than a reduction in the speed. Thus, in choosing between an first option of four Generation 1.0 lanes (at 1000 MB/s) versus a second option of using two Generation 2.0 lanes (at 1000 MB/s), for example, it may be beneficial (less power consumption) to choose the second option. In other words, it may be advantageous to implement (change the PCIe settings) to operate two Generation 2.0 lanes (at 1000 MB/s) instead of tour Generation 1.0 lanes (at 1000 MB/s), for example.

As appreciated by one of ordinary skill for PCIe, Generation 3 is 985 MB/s, Generation 2 is 500 MB/s, and Generation 1 is 250 MB/s. Listed are specific exemplary rules that may be employed to specify adjustment of the PCIe settings for a storage controller:

(1) If the backend (drives, etc.) need all of the bandwidth that the PCIe slot can give, then the maximum PCIe lanes and speed are used;

(2) If the PCIe slot is not capable of the number of lanes desired, then the PCIe speed is increased by one generation; and (3) If the PCI slot is not capable of the speed desired, the PCI lanes are increase by a factor of 2.

Lastly, it will be appreciated that the storage system 200 shown FIG. 2 is only one example of a storage system in accordance with embodiments. In an actual implementation, the storage system 200 may include various additional storage devices and networks, which may be interconnected in various fashions, depending on the design considerations of a particular implementation. A large storage system will often include many more storage arrays and servers 202 than depicted in FIG. 2. Further, the storage system 200 may provide data services to client computers, for example.

It should also be noted that examples of the storage system 200 may include only a single drive (or only a single drive mounted or in service) such as either only one drive 206 or one drive 210. These examples of a storage system 200 with only a single disk may be implemented in a RAID-0 (no redundancy) configuration, for instance. Such examples of a single-disk storage system may be applied depending on particular factors. A user, client, or customer may not need or desire RAID capabilities but instead focus on the caching capabilities the storage controller provides, for instance. Of course, other factors are applicable in deciding the number of drives.

Furthermore, examples of the storage system 200 may apply to a zero drive or no drive case. In other words, such examples of the storage system 200 do not have a storage drive (or do not have a storage drive mounted or in service). Thus, these examples of a storage system 200 may have N=0 storage drives 206 (associated with the storage fabric) and N=0 direct attached drives 210. Such may exist during system maintenance or downtime, during active/passive fail-over scenarios including with external storage, and so forth. In any case, the zero drive case could give an effective bandwidth of zero (no backend bandwidth is required). Thus, in certain instances of the zero-drive case, the settings of the storage system 200 including the storage controller 204 could be set to give the slowest speed and the minimum or no lanes to give the lowest power settings or consumption of the storage controller 204.

Figure 4:
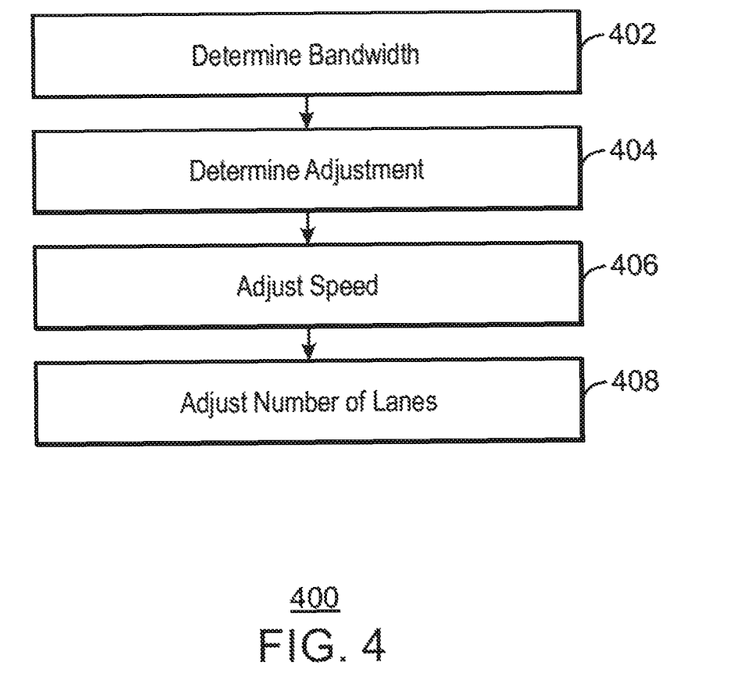
FIG. 4 is a process flow diagram of an exemplary method of operating a storage system in accordance with examples.

FIG. 4 is an exemplary method 400 of operating a storage system having a storage controller and storage drives. In the method 400, the performance backend bandwidth of the storage system, such as with storage drives, storage fabric(s), attached drives, and other devices, may be determined, as indicated by reference numeral 402. This determination (block 402) of the bandwidth may involve testing drives to measure their bandwidth at steady state conditions, for example. Further, such test data collected in previous tests may be retrieved.

To calculate a total backend bandwidth, the sum of the bandwidth performance values of any direct attached drives may be combined with the lessor of (1) the lowest fabric link bandwidth and (2) the sum of the performance of the drives coupled through the storage fabric. Further, a correction or reduction factor may be applied, such as in RAID configurations. In other words, as discussed above, because a RAID controller often creates significant extra I/O in order to create redundancies (the amount of redundancy depending on the RAID level and other factors), the effective amount of bandwidth may be less than base or directly calculated bandwidth.

Once the backend bandwidth is calculated or assumed, the adjustment to make to the generation (speed) and/or the number of active lanes of the PCIe bus or interconnect, for example, may be determined (block 404). The determination may involve deciding various combinations of generation (speed) and number of lanes that accommodate the calculated backend bandwidth (or effective backend bandwidth). The determination block 404) of the adjustment may involve comparing the power consumption of the various option combinations of speed and number of lanes, and choosing an option.

The selection option or combination may be implemented. In particular, the PCIe generation or speed of the PCIe bus may be adjusted (block 406) and/or the number of PCIe lanes may be adjusted (block 408). These action of bocks 406 and 408 may be performed in any order, including at the same time. In certain examples, such adjustments (blocks 408 and 408) may be accommodated by altering the advertised PCIe settings via the server BIOS for the storage controller (e.g., a RAID controller), for instance. Thus, speed and the number of the lanes operating through the front end from the storage controller through PCIe bus may be adjusted to lower power consumption while satisfying bandwidth requirements of the backend. Lastly, as indicated, the actions 402, 404, 406, and 408 of the method 400 may be implemented in any order. Moreover, the method 400 including actions 402, 404, 406, and 408 may be implemented via executable code, stored in memory (e.g., storage controller memory), executed by a processor such as by the server CPU or the storage controller processor.

Figure 5:
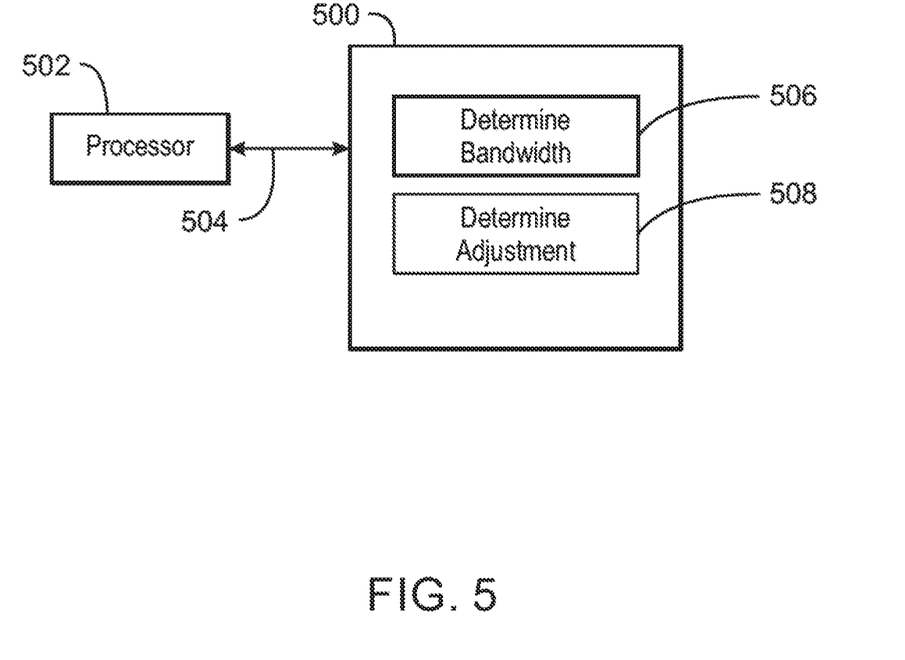
FIG. 5 is a block diagram showing a tangible, non-transitory, computer-readable medium that stores code configured to direct a storage system in accordance with examples.

FIG. 5 is a block diagram showing a tangible, non-transitory, computer-readable medium that stores code configured to operate a data storage system. The computer-readable medium is referred to by the reference number 500. The computer-readable medium 500 can include RAM, a hard disk drive, an array of hard disk drives, an optical drive, an array of optical drives, a non-volatile memory, a flash drive, a digital versatile disk (DVD), or a compact disk (CD), among others. The computer-readable medium 500 may be accessed by a processor 502 over a computer bus 504. Furthermore, the computer-readable medium 500 may include code configured to perform the methods described herein. The computer readable medium 500 may be the memory 218 or 222 of FIG. 2 in certain examples. The computer readable medium 500 may include firmware that is executed by a storage controller such as the storage controller 204 of FIG. 2 or an I/O device 104 of FIG. 1.

The various software components discussed herein may be stored on the computer readable medium 500. The software components may include the managing of power consumption in a server or storage system based on interconnect or PCIe throttling. A portion 506 of the computer-readable medium 500 can include a determine bandwidth module or executable code that directs a processor such a processor 106, 216, or 220 to determined backend bandwidth, such as that discussed above with respect to block 402 of FIG. 4, for example. A portion 508 can include a determine adjustment module or executable code that determines an adjustment to make to interconnect speed or number of lanes, such as discussed above with respect to block 404 of FIG. 4 and other techniques discussed herein. Other methods discussed above may be accommodated with software modules (executable code) stored on portions of the computer readable medium 500. Although shown as contiguous blocks, the software components can be stored in any order or configuration. For example, if the tangible, non-transitory, computer-readable medium is a hard drive, the software components can be stored in non-contiguous, or even overlapping, sectors.

Lastly, an example of a method may include determining via a processor a backend bandwidth of a storage system having a storage controller, wherein a backend of the storage system includes a single drive or a plurality of storage drives communicatively coupled to the storage controller. The exemplary method includes determining via the processor an adjustment to make to front end bandwidth of the storage system based on the backend bandwidth and to lower power consumption of the storage controller. The front end of the storage system may include an interconnect communicatively coupling the storage controller to a host component of the storage system, and wherein the foregoing adjustment includes to adjust a speed of a front end bus (e.g., a PCIe bus) of the storage system, the front end bus having the aforementioned interconnect. Furthermore, the adjustment may be to adjust a number of lanes of a front end interconnect communicatively coupled to the storage controller. The determining of the backend bandwidth may include applying a bandwidth reduction factor correlative to a redundant array of independent disks (RAID) level of the storage system. Application of such a factor may give an effective bandwidth of the backend. Further, the determining the adjustment may involve comparing configurations including combinations of negotiated speed and negotiated number of lanes of the interconnect. Lastly, the exemplary method may include implementing the adjustment, which may involve altering PCIe settings including PCIe setting of the storage controller.

An exemplary storage system may include a server having a storage controller (e.g., a RAID controller or HBA) and a front end bus, a backend having a single drive or a plurality of storage drives communicatively coupled to the storage controller, and a processor. The exemplary storage system includes a memory (e.g., a storage controller memory) storing code executable by the processor to determine an adjustment to front end bandwidth of the storage system based on the backend bandwidth and to lower power consumption of the storage controller, wherein the adjustment includes to adjust speed of the front end bus. The backend may include a storage fabric. The memory may store code executable by the processor to determine the backend bandwidth, and wherein to determine the backend bandwidth may include to apply a bandwidth reduction factor correlative to a RAID level of the storage system. To determine the backend bandwidth may likewise include applying a bandwidth reduction factor correlative to a write input/output (I/O) ratio divided by a write I/O amplification.

Lastly, techniques herein may provide for an example of a tangible, non-transitory, computer-readable medium having instructions that direct a processor to: determine a backend bandwidth of a storage system comprising a storage controller, wherein a backend of the storage system has single drive or a plurality of storage drives communicatively coupled to the storage controller; and determine an adjustment to make to front end bandwidth of the storage system based on the backend bandwidth and to lower power consumption of the storage controller, wherein the adjustment comprises to adjust speed of a front end bus. Determining the backend bandwidth may include applying a bandwidth reduction factor correlative to a redundant array of independent disks (RAID) level of the storage system, and wherein the adjustment may be to negotiate a number of lanes of an interconnect communicatively coupled to the storage controller, the front end bus having the interconnect.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method comprising:
    determining via a processor a backend bandwidth of a storage system comprising a storage controller, wherein a backend of the storage system comprises storage drives communicatively coupled to the storage controller, and wherein determining the backend bandwidth comprises applying a bandwidth reduction factor correlative to a redundant array of independent disks (RAID) level of the storage system; and
    determining via the processor an adjustment to make to front end bandwidth of the storage system based on the backend bandwidth and to lower power consumption of the storage controller; and
    implementing the determined adjustment to the front end bandwidth of the storage system.

2. The method of claim 1, wherein a front end of the storage system comprises an interconnect communicatively coupling the storage controller to a host component of the storage system, and wherein the adjustment comprises to adjust a speed of a front end bus of the storage system, the front end bus comprising the interconnect.

3. The method of claim 2, wherein the front end bus comprises a peripheral component interconnect express (PCIe) bus.

4. The method of claim 1, wherein determining the adjustment comprises comparing configurations comprising combinations of negotiated speed and negotiated number of lanes of the interconnect.

5. The method of claim 1, wherein implementing the adjustment comprises adjusting a number of lanes of a front end interconnect communicatively coupled to the storage controller.

6. The method of claim 1, wherein implementing the adjustment comprises altering peripheral component interconnect express (PCIe) settings of the storage controller.

7. A storage system comprising:
    a server comprising a storage controller and a front end bus;
    a backend comprising storage drives communicatively coupled to the storage controller;
    a processor; and
    a memory storing instructions executable by the processor to:
        determine an adjustment to front end bandwidth of the storage system based on the backend bandwidth and to lower power consumption of the storage controller, wherein the determination of the backend bandwidth comprises application of a bandwidth reduction factor correlative to a RAID level of the storage system; and
        adjust the front end bandwidth of the storage system based on the determined adjustment.

8. The storage system of claim 7, wherein the backend comprises a plurality of storage drives and a storage fabric, and wherein the storage controller comprises the memory.

9. The storage system of claim 7, wherein the storage controller comprises a host bus adapter (HBA).

10. The storage system of claim 7, wherein the memory stores instructions executable by the processor to determine the backend bandwidth.

11. The storage system of claim 10, wherein the storage controller comprises a redundant array of independent disks (RAID) controller.

12. The storage system of claim 10, wherein the instructions to determine the backend bandwidth comprise instructions to apply a bandwidth reduction factor correlative to a write input/output (I/O) ratio divided by a write I/O amplification.

13. A tangible, non-transitory, computer-readable medium comprising instructions executable by a processor to:
    determine a backend bandwidth of a storage system comprising a storage controller, wherein a backend of the storage system comprises storage drives communicatively coupled to the storage controller, and wherein the determination of the backend bandwidth comprises application of a bandwidth reduction factor correlative to a RAID level of the storage system;
    determine an adjustment to make to front end bandwidth of the storage system based on the backend bandwidth and to lower power consumption of the storage controller; and
    adjust the front end bandwidth of the storage system based on the determined adjustment.

14. The computer-readable medium of claim 13, wherein the instructions to adjust comprise instructions to negotiate a number of lanes of an interconnect communicatively coupled to the storage controller, the front end bus comprising the interconnect.

15. The computer-readable medium of claim 13, wherein the instructions to determine the backend bandwidth comprise instructions to apply a bandwidth reduction factor correlative to a write input/output (I/O) ratio divided by a write I/O amplification.

16. The computer-readable medium of claim 13, wherein the determined adjustment comprises a determined adjustment to a speed of the front end bus.

17. The method of claim 1, wherein the determining the backend bandwidth comprises applying a bandwidth reduction factor correlative to a write input/output (I/O) ratio divided by a write I/O amplification.

18. The method of claim 1, wherein implementing the determined adjustment comprises adjusting to a speed of the front end bus.

* * * * *